(12) United States Patent
Moein (10) Patent No.: US 12,361,126 B2
(45) Date of Patent: *Jul. 15, 2025

(54) AUTOMATIC DETECTION OF MALWARE FAMILIES AND VARIANTS WITHOUT THE PRESENCE OF MALWARE FILES BASED ON STRUCTURE PRESENTATION

(71) Applicant: Fortinet, Inc., Sunnyvale, CA (US)

(72) Inventor: Samer Moein, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,507

(22) Filed: Mar. 13, 2024

(65) Prior Publication Data

US 2024/0289453 A1  Aug. 29, 2024

Related U.S. Application Data

(63) Continuation of application No. 18/079,563, filed on Dec. 12, 2022.

(51) Int. Cl.
*G06F 21/56* (2013.01)

(52) U.S. Cl.
CPC ............ *G06F 21/56* (2013.01); *G06F 21/564* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,165,142 B1 * | 10/2015 | Sanders | .............. | H04L 63/1416 |
| 10,282,546 B1 * | 5/2019 | Parikh | .................... | G06N 3/084 |
| 10,432,648 B1 * | 10/2019 | Xu | .......................... | G06N 20/00 |
| 11,151,248 B1 * | 10/2021 | Batur | .................... | G06F 21/565 |
| 2021/0141897 A1 * | 5/2021 | Seifert | .................. | G06F 21/565 |

* cited by examiner

*Primary Examiner* — Lashonda Jacobs-Burton
(74) *Attorney, Agent, or Firm* — Law Office of Dorian Cartwright; Dorian Cartwright (57) ABSTRACT

A string sample is received from a file in real-time and the string sample is converted to a Tetra code and used to search a database of Tetra code samples, organized by family and then by variant. It is determined whether the real-time Tetra code fits any family mask, and if not a new family mask is created. It is also determined whether real-time Tetra code fits any variant mask within the family mask, and if not, a new variant mask is created. The real-time Tetra code is stored in the database associated with the new family label and/or the new variant label. Any label for the file string sample is output for potential security actions.

8 Claims, 8 Drawing Sheets

AUTOMATIC DETECTION OF MALWARE FAMILIES AND VARIANTS WITHOUT THE PRESENCE OF MALWARE FILES BASED ON STRUCTURE PRESENTATION

RELATED APPLICATIONS

This application is a continuation of U.S. application Ser. No. 18/079,563, filed on Dec. 12, 2022, which is incorporated herein by reference in its entirety.

FIELD OF THE INVENTION

The invention relates generally to computer security, and more specifically, to automatic detection of malware families and variants, without the presence of malware files, based on structure presentation of families of malware and variants within each family for abstracted features of string samples.

BACKGROUND

Malicious files attacks can number in thousands per day per day, driven by economic benefits. A significant defense line against malware is security software products, which mainly use a signature-based method to recognize client threats. Given a collection of malware files, these vendors first categorize the samples into families so that samples in the same family share some common data and generate the common string (s) to detect variants of a family of malware samples.

Several well-known techniques are available, like imphash, ssdeep, and Vhash. The "imphash" has one hash for the whole dataset but is generally known as the weakest because it just cares about the import information (i.e., most packing techniques have the same import table, which means it has the same import hash). This technique has no known means to know the relation between signatures except "ssdeep." Meanwhile, ssdeep calculates the fuzzy hash for the whole file and has a variable size and cannot produce a close hash for related files. Vhash is the closest one with minor modifications, but it is a property clustering technique, and no information has been published. Besides, there is no information for calculating the relationship among files.

Most existing techniques require tracing the whole file and extracting a predefined set of information that the methods relied on or calculating some hashing for file chunks to generate a unique file hash. Besides, the relation between hashes has not been studied.

What is needed is a robust technique for automatic detection of malware families and variants blindly (e.g., without the presence of malware files) based on structure presentation of families of malware and variants within each family for abstracted features of string samples.

SUMMARY

To meet the above-described needs, methods, computer program products, and systems for automatic and blind detection of malware families and variants, without the presence of malware files, based on structure presentation of families of malware and variants within each family for abstracted features of string samples.

In one embodiment, a plurality of Tetra code samples is received and stored in a database. The database can be organized by family and then by variant, along with a label to indicate the Tetra code sample as malicious, clean, mixed, or unknown, for example. In one case, clean, malicious and unknown labels apply to family and variant levels, while mixed labels are different at each level.

In another embodiment, a string sample is received from a file in real-time and the string sample is converted to a Tetra code. It is determining whether the real-time Tetra code matches any stored Tetra codes, within a threshold and, if the real-time Tetra code matches a stored Tetra code, a label is retrieved for a family and a label for a variant associated with the stored Tetra code. A family mask associated with the stored Tetra code and a variant mask within the family can both be recalculated, as an update for the new string sample.

In yet another embodiment, responsive to the real-time Tetra code does not match any stored Tetra codes, it is determined whether the real-time Tetra code fits any family mask, and responsive to the real-time Tetra code matches a family mask, the label for family is retrieved and the family mask is recalculated. Responsive to the real-time Tetra code matching the family mask, it is determined whether real-time Tetra code fits any variant mask within the family mask, and if the real-time Tetra code matches a variant mask, the label for the variant is retrieved and the variant mask is recalculated. However, responsive to the Tetra code not fitting any family mask, a new family is created and a new label is created for the new family, and responsive to the Tetra code not fitting any variant mask, a new variant is created within the family and a new label is created for the new variant. The real-time Tetra code is stored in the database associated with the new family label and/or the new variant label. Any label for the file string sample is output.

Advantageously, network performance and computer performance are improved with better network security against malicious files.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for automatic detection of malware families and variants without the presence of malware files based on structure presentation of families of malware and variants within each family for abstracted features of string samples. One of ordinary skill in the art will recognize many alternative embodiments that are not explicitly listed based on the following disclosure.

I. Systems for Malware Family and Variant Detection (FIGS. 1-2)

Figure 1:
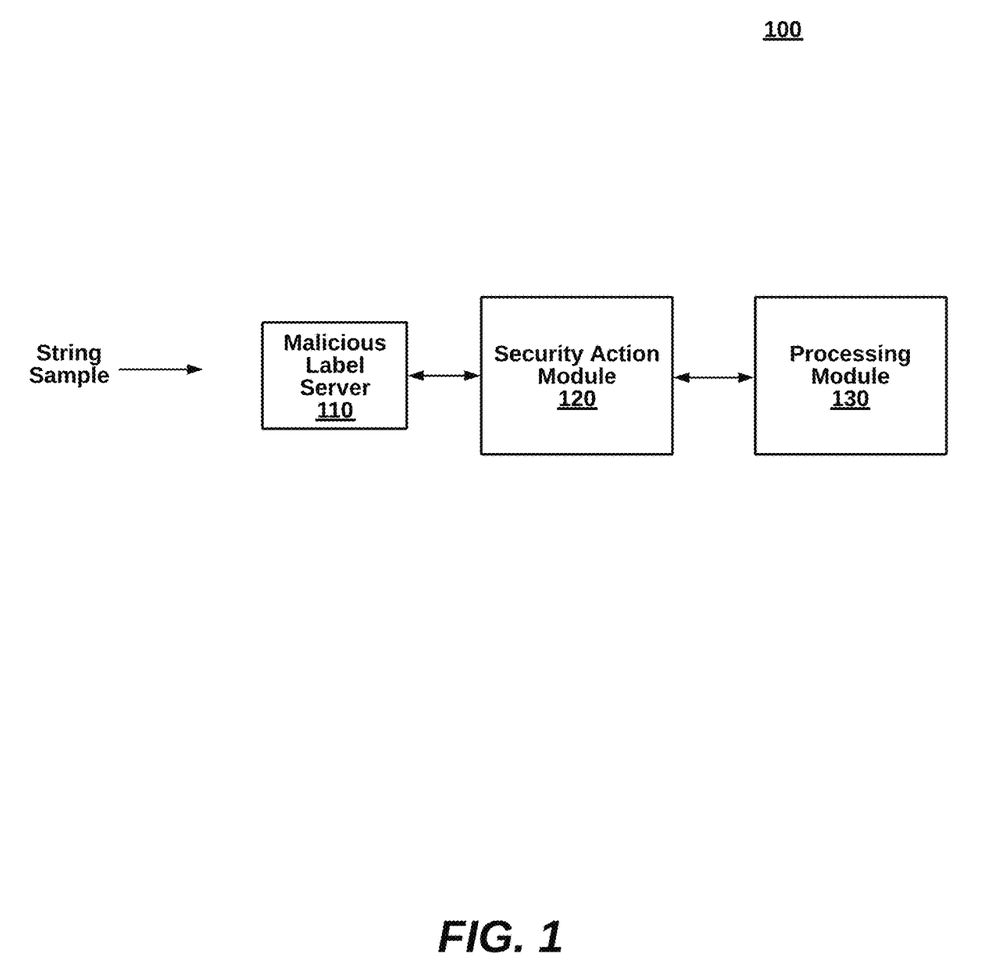
FIG. 1 is a high-level block diagram illustrating a system for automatic detection of malware families and variants blindly, without the presence of malware files, based on structure presentation of families of malware and variants within each family for abstracted features of string samples, according to one embodiment.
Figure 2:
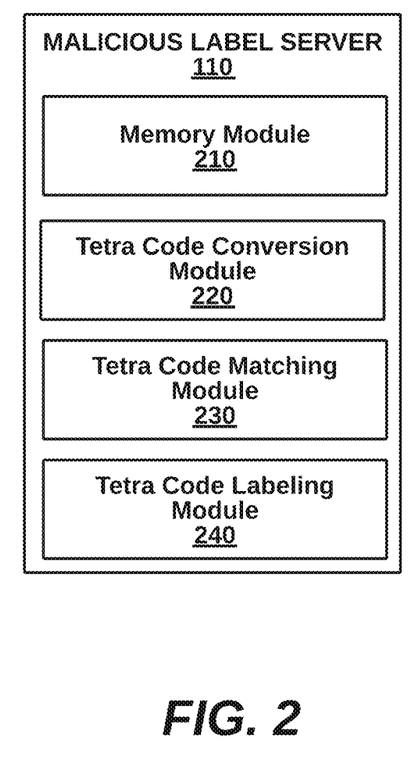
FIG. 2 is a more detailed block diagram illustrating a malicious label server of the system of FIG. 1, according to one embodiment.

FIG. 1 is a high-level block diagram illustrating an automatic detection system 100 for malware families and variants, without the presence of malware files, based on structure presentation of families of malware and variants within each family for abstracted features of string samples, according to one embodiment. The system 100 includes a Tetra code module 110, a security action module 120 and a processing module 130. Other embodiments of the system 100 can include additional components that are not shown in FIG. 1.

In one embodiment of system 100, a string sample is received from a PE file in real-time and the string sample is converted to a Tetra code and used to search a database of Tetra code samples, organized by family and then by variant. It is determined whether the real-time Tetra code fits any family mask, and if not, a new family mask is created. It is also determined whether real-time Tetra code fits any variant mask within the family mask, and if not, a new variant mask is created. The real-time Tetra code is stored in the database associated with the new family label and/or the new variant label. Any label for the file string sample is output for potential security actions.

The Tetra code module 110 processes samples of text strings from files to identify a malicious label associated with the text string. The files can be part of an executable file, a data packet or session of data packets, user input, a snippet of source code, or the like. The malicious label can be one or more of malicious, clean, mixed, and unknown. Many variations of labels and number of labels are possible. The malicious label server 110 can be located locally on a LAN or located remotely located on a WAN.

In one embodiment, the automatic detection system 100 comprises Horus, which relies on Tetra code. Generally, Tetra code is an encoded presentation of portable executable (PE) files based on their structure using homomorphic encryption and supports basic arithmetic operations over encrypted data. The PE file format encapsulates information for a Windows OS loader to manage the wrapped executable code. Tetra code supports basic arithmetic operations, comparison features for decision-making, and flexibility checks for related internal design. The blind detection enabled by Tetra code protects privacy of the files, needing only the Tetra code and SHA2 for identification.

Figure 3A:
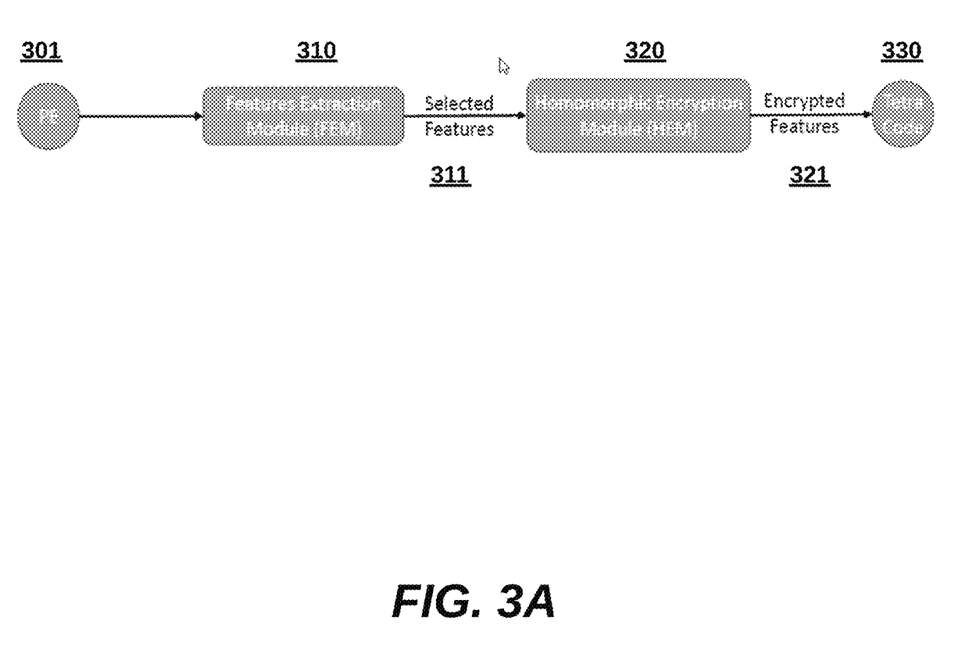
FIG. 3A is a block diagram illustrating the transformation of a file to Tetra code, according to one embodiment.

The Tetra code structure, of one implementation, is 256-bit long and is designed to represent a PE file with selected structure features. These features are encrypted using a homomorphic encryption algorithm, as shown in FIG. 3A.

More specifically, a PE 301 is processed by a features extraction module (FEM) 310 and a homomorphic encryption module (HEM) 320 to output Tetra code 330. Selected features 311 are extracted by the FEM 310 and output by the HEM 320 as encrypted features 321 embedded in the Tetra code 330. The resulting Tetra code is divided into two parts, fixed and variable parts. The fixed part is mostly identical within a family of PE files. The variable part is almost identical for each variant within a family. Different PE files with identical Tetra codes have identical structures and may have slightly different contents.

Figure 3B:
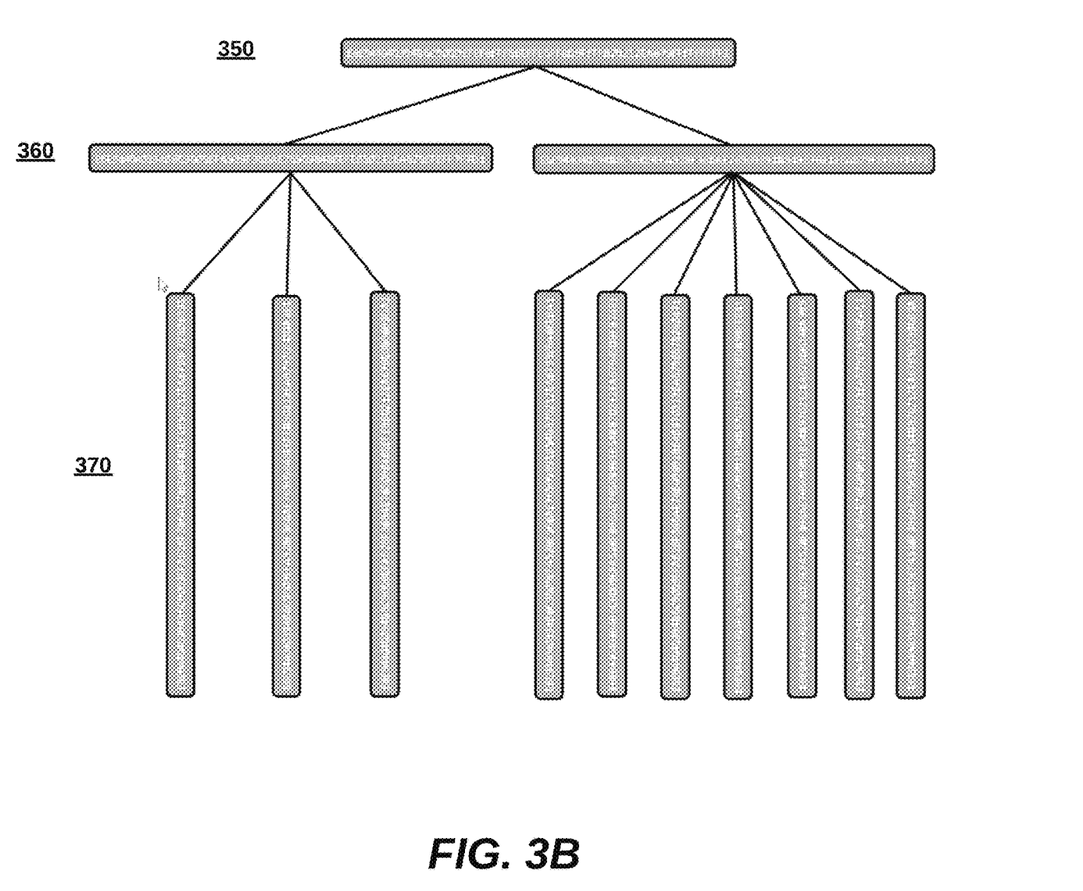
FIG. 3B is a chart illustrating the organization of Tetra code samples stored under family masks and variant masks, according to an embodiment.

System 100 generates equivalent Tetra code and stores organized by families and variants, as shown in FIG. 3B. The families and variants are dynamic in that they can be updated for every new malware detected as belonging to a particular family and variant. This feature allows the detection system to detect malware based on family or variant level, which helps to predict zero-day variants. At the same time, it enhances the performance by applying the hierarchy check starting from the family level and then its related variants.

Figure 3C:
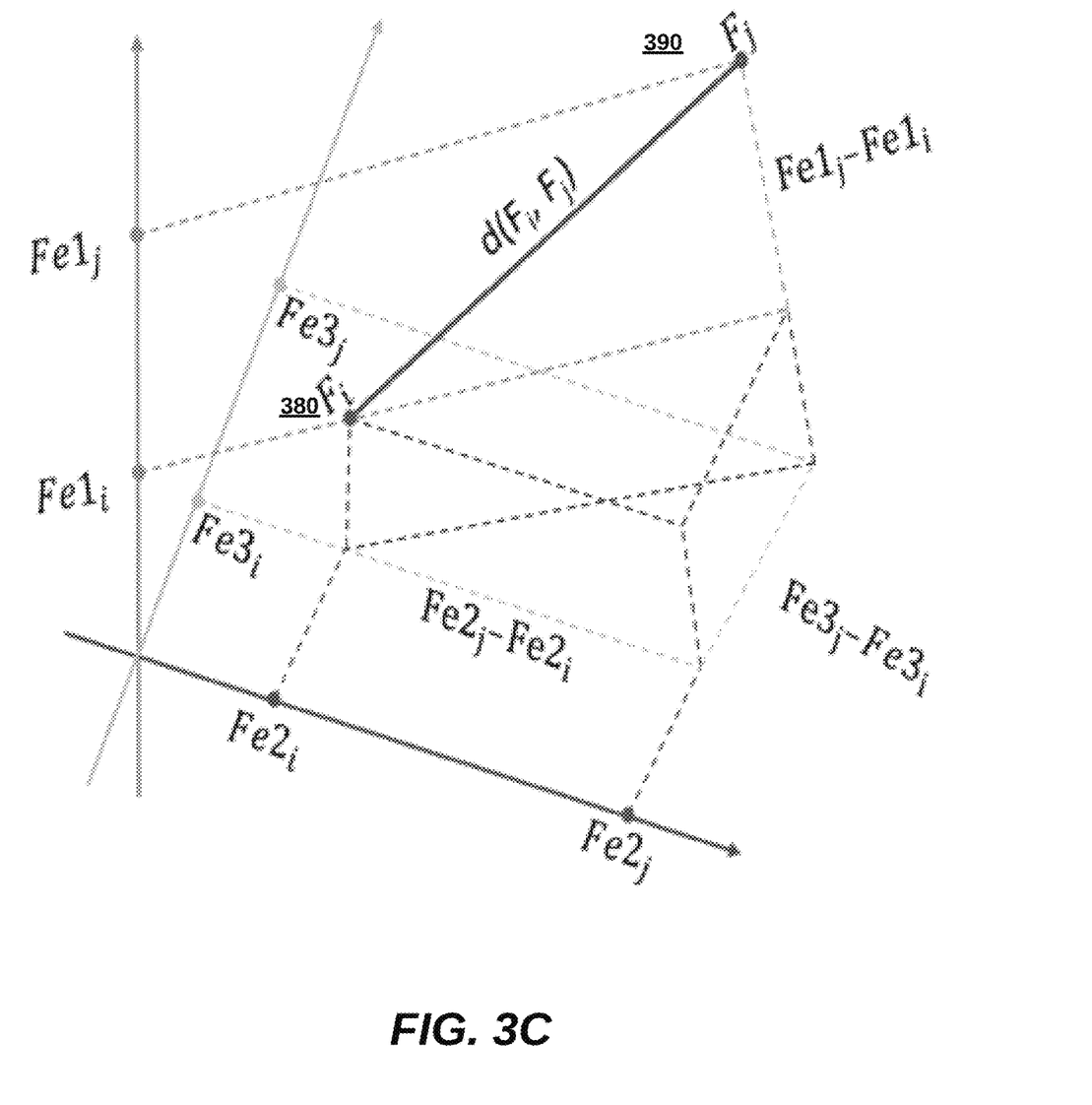
FIG. 3C is a chart illustrating features of different Tetra code files used to compare against stored Tetra code files, according to an embodiment.

System 100 uses basic arithmetic operations over encrypted Tetra codes to detect related codes, as shown in FIG. 3C. A complete relationship between malware files is provided. The closet set of malicious files that are almost identical for each malware is defined as its variant and family. In addition, other versions fall under different variants but fall under the same family. The relation between some of the features used to build Tetra codes for two files, Fi 380 and Fj 390, are mapped. System 100 can calculated the differences between files as a whole, d (Fi, Fj), based on analysis and define acceptable ranges for a feature to be detected by a family or used for a static signature. Differences between features of files, (Fe1j-Fe1i), (Fe2j-Fe2i), (Fe3j-Fe3i), can also be considered in an algorithm. Thresholds can be uniform across the system 100 or different threshold levels can be set for different families or different variants. Many implementation-specific modifications are possible.

The security action module 120, responsive to a malicious label, can take a security action to prevent damage from the malicious file. For example, security rules can quarantine a portion of memory to prevent further damage. In another example, requests to an operating system from the file can be ignored. In still another example, an intrusion detection system is notified for further action. These examples of security actions are non-limiting as many other security action configurations are possible, withing the scope of the present disclosure. In some cases, security actions are also taken against mixed or unknown files. Some files are still passed to the processing module 130 for execution while some files are quarantined to prevent damage.

The processing module 130 receives clean files for execution, storage, and other transactions. Malicious files have been blocked. In some cases, mixed or unknown files are also blocked. Preferably, the file is executed by the processing module 130 without any malicious attacks.

In one embodiment, the components of the automatic detection system 100 are coupled in communication over a data communication network, such as the Internet. The components can be connected to the data communication system via hard wire. The components can also be connected via wireless networking. The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like. Components can use IPV4 or IPV6 address spaces.

FIG. 2 is a more detailed block diagram illustrating the Tetra code module 110 of the system of FIG. 1, according to one embodiment. The Tetra code module 110 includes a memory module 210, a Tetra code conversion module 220, a Tetra code matching module 230, and a Tetra code labeling module 240. The components can be implemented in hardware, software, or a combination of both.

The memory module 210 can store a plurality of Tetra code samples in a database. The Tetra files, in one instance, are organized by family and then by variant, along with a malicious label to indicate the Tetra code sample as malicious, clean, mixed, or unknown. Also, the real-time Tetra code can be stored in the database and associated with a new family label and/or a new variant label. Any label for the file string sample is output from the memory module 210.

The Tetra code conversion module 220 receives a string sample from a file in real-time and converts the string code sample to a Tetra code, as shown in FIG. 3A. The string sample can have a minimum length and meet other requirements as configured. The Tetra code can be a hash of the string. One example of the Tetra code structure is 256-bit long and is designed to represent a PE file with selected structure features. These features are encrypted using a homomorphic encryption algorithm in FIG. 3A.

The Tetra code matching module 230, in an embodiment, determines whether the real-time Tetra code matches any stored Tetra codes, within a threshold. If the real-time Tetra code matches a stored Tetra code, a label for a family and a label for a variant associated with the stored Tetra code is retrieved. A family mask associated with the stored Tetra code and a variant mask within the family are recalculated. The family mask is recalculated to account for the new addition. There may be no change, but the additional Tetra code may reduce the features in common between a family and/or variant, thereby requiring a new mask.

The Tetra code matching module 230, responsive to the real-time Tetra code does not match any stored Tetra codes, determines whether the real-time Tetra code fits any family mask. To do so, real-time Tetra code is OR'ed with an existing family Tetra code or an existing variant Tetra code to compare it against a family check Tetra code or a variant check Tetra code. Responsive to the real-time Tetra code matching a family mask, the label for family is retrieved and the family mask is recalculated.

The Tetra code matching module 230, responsive to the real-time Tetra code matching the family mask, determines whether real-time Tetra code fits any variant mask within the family mask. If the real-time Tetra code matches a variant mask, the label for the variant is retrieved. Additionally, the variant mask is recalculated. Each family and variant has a pair of Tetra codes, family Tetra code and variant Tetra code, and family check Tetra code and variant check Tetra code. The pair work together to accumulate and check Tetra codes under a family and variant.

One non-limiting example of Tetra code masks is shown in FIG. 3B. A hierarchy of masks is illustrated in which a family mask 310 has two variant masks 320. A final level of ten Tetra codes 330 is categorized by the variant masks 320. Other embodiments can have more families, more variants, and more Tetra codes.

The Tetra code label module 240 is configured to, responsive to the Tetra code not fitting any family mask, create a new family and create a new label for the new family. Responsive to the Tetra code not fitting any variant mask, a new variant is created within the family and a new label is created for the new variant. In one embodiment, a family or variant mask is recalculated by XOR circuits. If there is only one existing family or variant code for a particular family or variant mask, it is recalculated by XOring the existing mask with real-time Tetra code being tested. If there is more than one existing mask, it is recalculated by special XORing (SXORing) the existing mask with real-time Tetra code.

II. Methods for Malware Family and Variant Detection (FIGS. 4-5)

Figure 4:
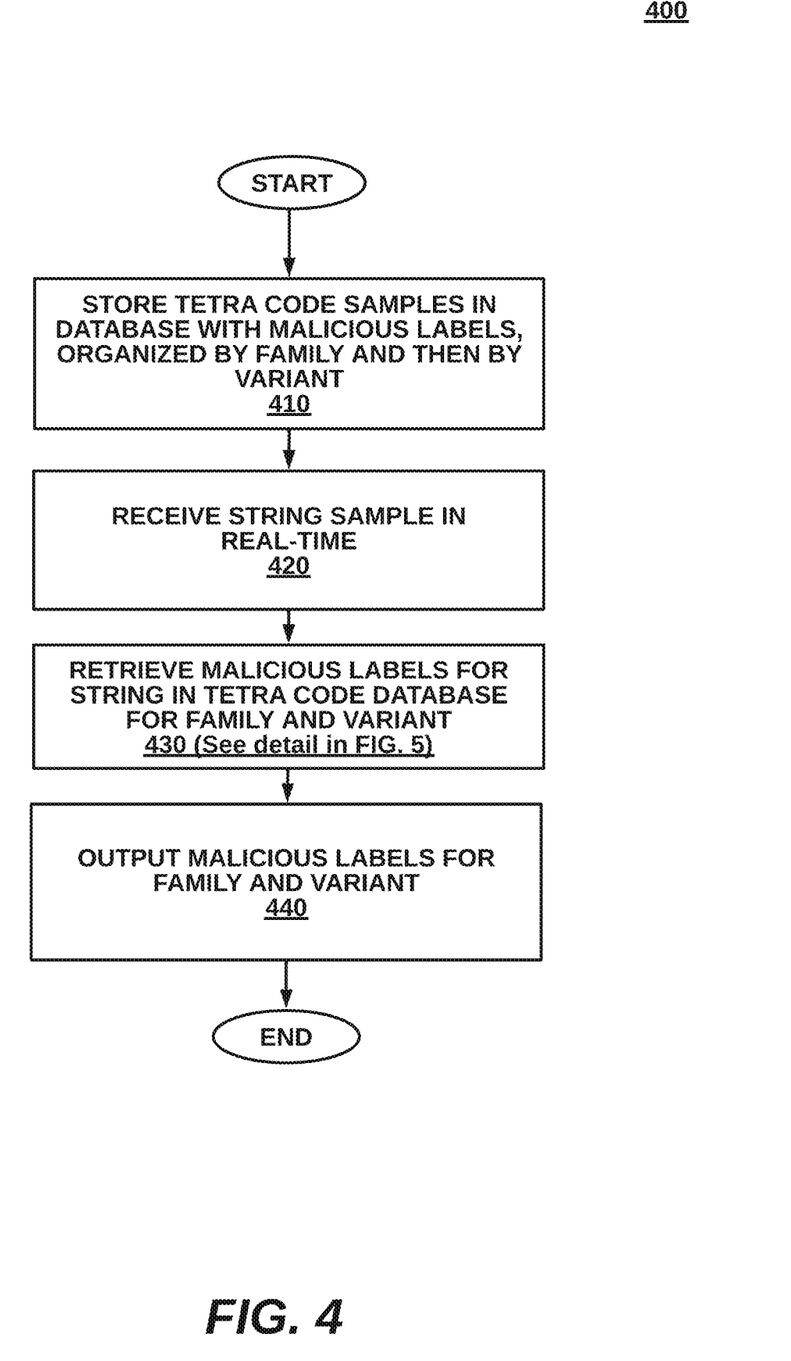
FIG. 4 is a high-level flow diagram illustrating a method for automatic detection of malware families and variants, without the presence of malware files, based on structure presentation of families of malware and variants within each family for abstracted features of string samples, according to one embodiment.
Figure 5:
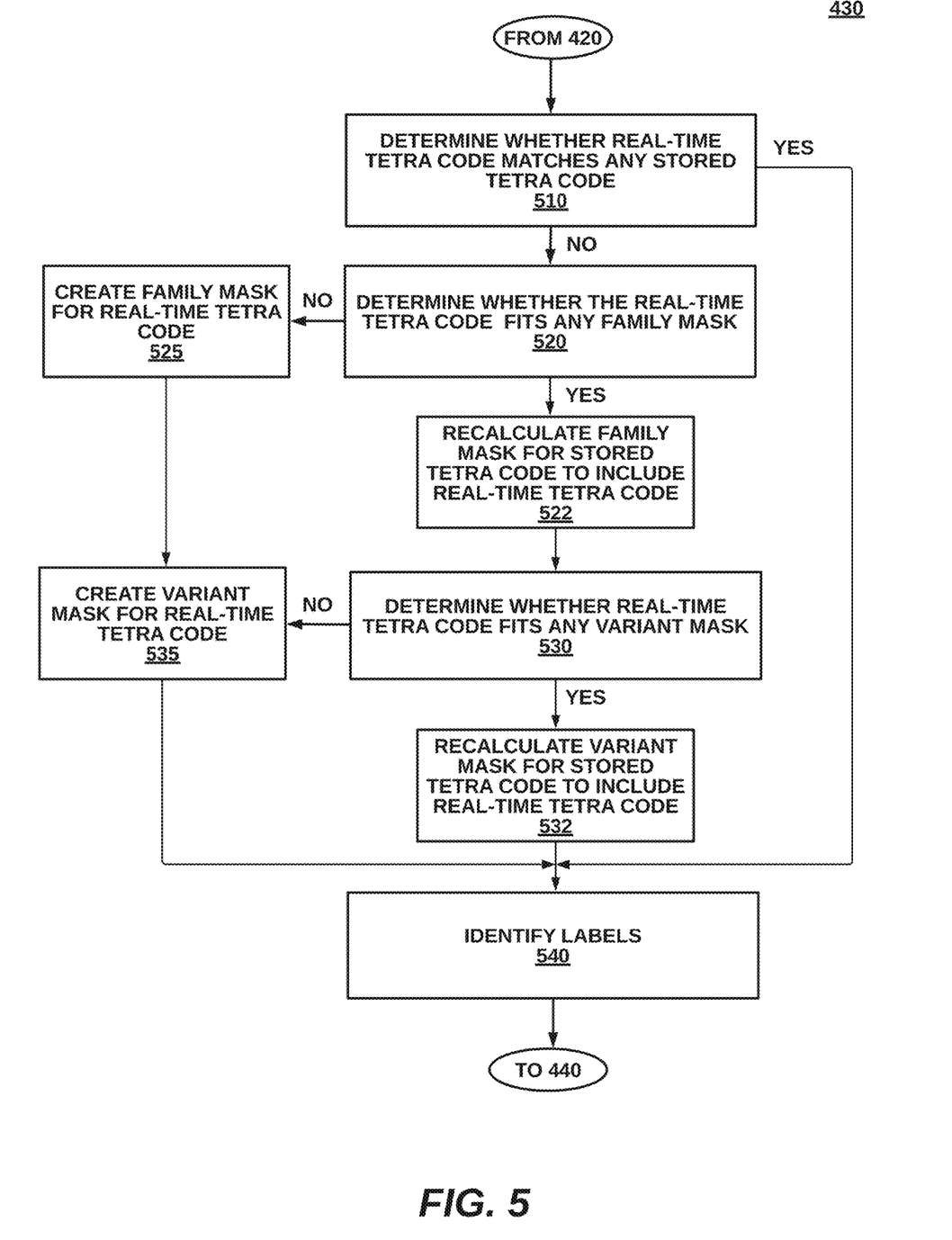
FIG. 5 is a more detailed flow diagram illustrating a step for retrieving malicious labels for string samples in Tetra code database for family and variant, from the method of FIG. 4, according to one embodiment.

FIG. 4 is a high-level flow diagram illustrating a method 400 for automatic detection of malware families and variants without the presence of malware files based on structure presentation of families of malware and variants within each family for abstracted features of string samples, according to an embodiment. The method 300 can be implemented by, for example, the virtual SDWAN interface 112 of FIG. 1.

At step 410, a plurality of Tetra code samples in stored a database, organized by family and then by variant. Also a label is associated to indicate each Tetra code sample as malicious, clean, mixed, or unknown.

At step 420, a string sample from a file is received in real-time. The string sample to then converted Tetra code, as described herein. In one case, the string sample comprises the whole file in its entirety. In other cases, the string sample comprises a partial or minute part of the file in its entirety.

At step 430, malicious labels for family and variant are searched in the database, as described further in FIG. 4.

At step 440, any label discovered for the file string sample is output. In one implementation, the output is a malicious label indicating one or more of malicious, clean, mixed, or unknown. Other implementations can have varied output configurations based on the context of use, and remain within the scope of the present disclosure.

At step 510, determining whether the real-time Tetra code matches any stored Tetra codes, within a threshold. If the real-time Tetra code matches a stored Tetra code, a label is retrieved for a family and for a variant associated with the stored Tetra code. A family mask associated with the stored Tetra code and a variant mask within the family are recalculated. The recalculation ensures that the mask fits the stored Tetra code and the real-time Tetra code (now stored) in combination.

At step 520, responsive to the real-time Tetra code not matching any stored Tetra codes, it is determined whether the real-time Tetra code fits any family mask. Responsive to the real-time Tetra code matching a family mask, the label for family is retrieved and the family mask is recalculated.

At step 530, responsive to the real-time Tetra code matching the family mask, it is determined whether real-time Tetra code fits any variant mask within the family mask. If the real-time Tetra code matches a variant mask, the label for the variant is retrieved and the variant mask is recalculated.

At step 540, responsive to the Tetra code not fitting any family mask, a new family is created and a new label is created for the new family. Responsive to the Tetra code not fitting any variant mask, a new variant is created within the family. A new label is created for the new variant.

At step 550, the real-time Tetra code stored in the database associated with the new family label and/or the new variant label.

III. Computing Device for Deriving Connection Thresholds (FIG. 5)

Figure 6:
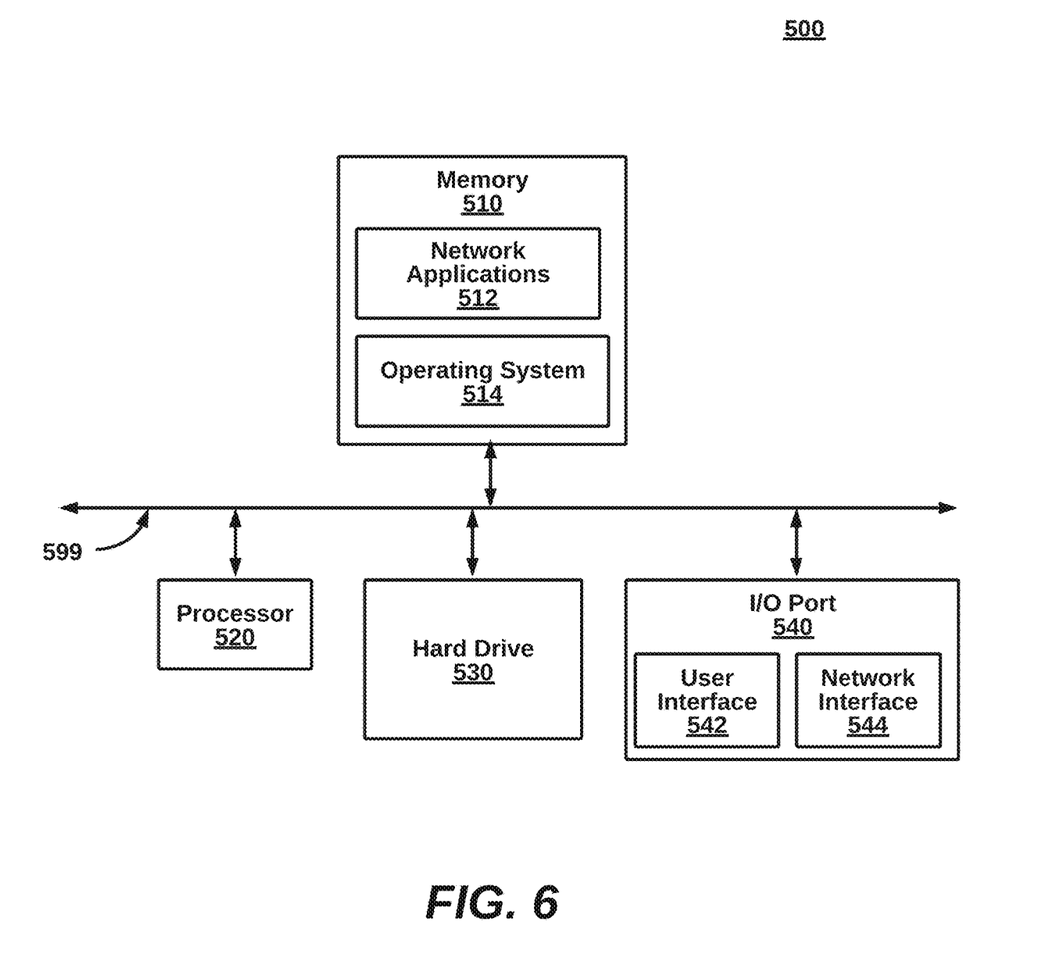
FIG. 6 is a block diagram illustrating an example computing device for the system of FIG. 1, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including local and remote SDWAN controllers 110, 120 and clients 115, 125. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access applications, an access applications that uses networking, a remote access applications executing locally, a network protocol access applications, a network management access applications, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a malicious detection system at least partially implemented in hardware for managing malicious labels of families of malware and variants within each family for abstracted features of string samples, the method comprising:
   receiving storing a plurality of Tetra code samples in a database, organized by family and then by variant, along with a label to indicate the Tetra code sample as malicious, clean, mixed, or unknown;
   receiving a string sample from a file in real-time and converting the string sample to a Tetra code;
   determining whether the real-time Tetra code matches any stored Tetra codes;
   responsive to the real-time Tetra code not matching any stored Tetra codes, determining whether the real-time Tetra code fits any family mask;
   responsive to the Tetra code not fitting any family mask, creating a new family and creating a new label for the new family, and responsive to the Tetra code not fitting any variant mask, creating a new variant within the family and creating a new label for the new variant;
   storing the real-time Tetra code in the database associated with the new family label and/or the new variant label; and
   outputting any label for the file string sample.

2. The method of claim 1, further comprising:
   updating the family label and/or the variant label.

3. The method of claim 1, wherein the step of converting the string sample to the Tetra code further comprises:
   extracting selected features from the string sample; and
   encrypting the selected features with homomorphic encryption.

4. The method of claim 1, wherein the step of determining whether the real-time Tetra code fits any family mask, and the step of determining whether real-time Tetra code fits any variant mask are comparisons operated at a bit level.

5. The method of claim 1, wherein the step of recalculating the family mask further comprises:
   determining whether a number of Tetra codes for the family is one or more than one; and
   responsive to one Tetra code for the family, updating the family mask by XORing the family mask with real-time Tetra Code, and ORing the updated family mask with the real-time Tetra code.

6. The method of claim 5, wherein the step of recalculating the family mask further comprises:
   responsive to more than one Tetra code for the family, updating the family mask by special XORing (SXORing) the family mask with the real-time Tetra code, and ORing the updated family mask with the real-time Tetra code.

7. A non-transitory computer-readable medium in a malicious detection system at least partially implemented in hardware storing instructions that, when executed by a processor, perform a computer-implemented method for managing malicious labels of families of malware and variants within each family for abstracted features of string samples, the method comprising:
   receiving storing a plurality of Tetra code samples in a database, organized by family and then by variant, along with a label to indicate the Tetra code sample as malicious, clean, mixed, or unknown;
   receiving a string sample from a file in real-time and converting the string code sample to a Tetra code;
   determining whether the real-time Tetra code matches any stored Tetra codes;
   responsive to the real-time Tetra code not matching any stored Tetra codes, determining whether the real-time Tetra code fits any family mask;
   responsive to the Tetra code not fitting any family mask, creating a new family and creating a new label for the new family, and responsive to the Tetra code not fitting any variant mask, creating a new variant within the family and creating a new label for the new variant;
   storing the real-time Tetra code in the database associated with the new family label and/or the new variant label; and
   outputting any label for the file string sample.

8. A malicious detection system at least partially implemented in hardware for managing malicious labels of families of malware and variants within each family for abstracted features of string samples, the malicious detection system comprising:
   a processor;
   a network interface communicatively coupled to the processor and to the hybrid wireless network; and
   a memory, communicatively coupled to the processor and storing:
      a database to store a plurality of Tetra code samples organized by family and then by variant, along with a label to indicate the Tetra code sample as malicious, clean, mixed, or unknown;
      a Tetra code conversion module to receive a string sample from a file in real-time and converting the string code sample to a Tetra code;
      a Tetra code matching module to determine whether the real-time Tetra code matches any stored Tetra codes, wherein responsive to the real-time Tetra code not matching any stored Tetra codes, the Tetra code matching module determines whether the real-time Tetra code fits any family mask; and
      a Tetra code labeling module, responsive to the Tetra code not fitting any family mask, to create a new family and creating a new label for the new family, and responsive to the Tetra code not fitting any variant mask, creating a new variant within the family and creating a new label for the new variant, wherein the real-time Tetra code is stored in the database associated with the new family label and/or the new variant label; and
      outputting any label for the file string sample.

* * * * *